United States Patent Office 2,755,275
Patented July 17, 1956

2,755,275
PROCESS FOR SULFATING CHITIN

Ira B. Cushing, Waukegan Township, Lake County, and Edward J. Kratovil, Chicago, Ill., assignors to Abbott Laboratories, North Chicago, Ill., a corporation of Illinois No Drawing. Application August 29, 1952,
Serial No. 307,172

2 Claims. (Cl. 260—211)

This invention relates to a process of sulfating polysaccharides and more particularly to a process for the simultaneous sulfation and degradation of polysaccharides to form sulfated lower molecular weight useful products.

The sulfation of polysaccharides is an old and well known chemical reaction. It has usually been most successful where employed chlorsulfonic acid as the sulfating agent and pyridine as the acid acceptor and diluent. Chlorsulfonic acid is extremely difficult to use by itself and it is common practice to employ pyridine in order to make the reaction more readily controllable. The result has been far from satisfactory however, because pyridine invariably forms color bodies with the reactants and discolors the products. Also, pyridine is expensive and the control of the reaction still leaves a lot to be desired.

It is an object of the invention to provide a method for sulfating and degrading polysaccharides in a convenient and economic procedure.

Another object of the invention is to provide a method for using chlorsulfonic acid as a sulfating agent for polysaccharides without employing pyridine as a diluent.

In accomplishing the foregoing objects and in accordance with the practice of the invention, we have now found that we can simultaneously sulfate and degrade a polysaccharide using chlorsulfonic acid in the presence of a solvent inert to the sulfating agent. In general our process may be described as one in which chlorsulfonic acid or sulfur trioxide is dissolved in a solvent which is inert to the sulfating agents. Dry polysaccharide is added to the acid solution while maintaining the temperature below room temperature. The sulfation is a vigorous reaction which may be controlled by maintaining the reaction temperature between about —15° C. and room temperature for several hours. Then the reaction products are washed with additional solvent for the sulfating agent. An anhydrous nitrogen-containing neutralizing agent is then added followed by the addition of water. Thereafter the mixture is contacted with alcohol to remove the sulfated product in the solvent phase. If desired we may form a metal salt immediately by contacting the sulfated product with an alkali metal or alkaline earth metal basic compound. The salt is then freed from underside components such as the short chain polysaccharide residues and uncombined ions in the solution, followed by recovery of the substantially pure salt of the sulfated polysaccharides. Further details of the process are contained in the examples which will be presented hereinafter.

Sulfated polysaccharides have a number of uses, particularly as a substitute for heparin as a blood anticoagulant.

The polysaccharides to which this invention pertains are those which contain free hydroxyl radicals. As members of this class may be mentioned chitin, oxychitin, chitosan, cellulose, pectin, dextran, agar agar, and oxidized forms of cellulose and dextran.

Chlorsulfonic acid is the preferred sulfating agent but we may also employ other sulfating agents such as sulfur trioxide.

The solvent for the sulfating agents should be one which is chemically inert to the sulfating agent, i. e., one which does not combine chemically with the sulfating agent. Dichloroethane is a good representative of this class because it is inexpensive, readily recoverable and inert to chlorsulfonic acid. Other liquid halogenated alkanes may also be employed such as trichloroethane and tetrachloroethane. Other inert solvents in which the sulfating agent is soluble are carbon disulfide, chloroform, trichlorethene, mixed chlorinated solvents and sulfur dioxide.

We prefer to use a nitrogen containing base for the neutralization of the sulfated product. The nitrogen containing compounds should be anhydrous and it should have an ionization constant of $10^{-5}$ or higher. Our preferred compounds may be designated by the formula $R_xNH_{3-x}$ where $x$ is 0, 1, 2, or 3, and where R is an aliphatic radical containing up to 18 carbons. As examples of this class of compounds may be cited ammonia, mono, di, and tri alkylamines such as mono, di and tri ethyl and methyl amines. In the higher amines we may use such compounds as laurylamine and decylamine.

The degree of sulfation and degradation may be controlled by the operator, and products of any desired molecular weight may be obtained by altering the conditions of time and temperature in the sulfation reaction. In an example which will be presented hereinafter the molecular weight of the chitin sulfate was regulated at between 10,000 and 16,000. It is well within the skill of the average chemist to obtain higher or lower molecular weight product merely by changing the reaction conditions somewhat.

Several important advantages attend the practice of this invention. In the first place the color of the product is greatly improved due to the elimination of pyridine from the reaction. Secondly, the cost of manufacture is reduced sharply. Thirdly, the sulfation is conducted at a more reasonable temperature, i. e., room temperature, and the elimination of heat lowers costs, increases the convenience of the reaction and helps to improve the color of the product. Fourthly, the presence of an inert solvent increases the ease of control of the reaction and makes possible the removal of most of the unused chlorsulfonic acid. Fifthly, the reaction can be reproduced with considerable accuracy, in contrast to the great variation in products obtained by sulfation in the previously known method employing pyridine as the diluent.

The following examples are presented for the purpose of describing the invention in its entirety. It is to be understood, however, that the invention is not to be limited in any way by the examples.

Example 1

To 300 ml. dried redistilled dichlorethane in a three-necked one liter flask was added 60 ml. redistilled chlorsulfonic acid. The flask was partially immersed in a cold water bath and the middle neck of the flask was equipped with an air-tight, all-glass, motor-driven stirrer. A slow stream of dry nitrogen was passed in one of the necks and the third neck was closed with a plug of glass wool.

When the inside temperature was reduced to 10° C., 25 grams of chitin (previously dried in high vacuum over concentrated sulfuric acid or calcium hydride) was slowly added. The maximum temperature of the contents of the flask was 17° C. The temperature of the bath was changed to 25° C. and sulfation time was counted as beginning when bath temperature reached 25° C. Sulfation was continued 2 hours.

The stirrer was then stopped, a siphon tube equipped with a glass wool plug was immersed in the sulfation mixture, and the dichlorethane, containing considerable unused chlorsulfonic acid, was removed with the aid of a slight positive nitrogen pressure. Three hundred ml. fresh dichlorethane was added and the stirrer was started again for 5 minutes. This dichlorethane was also removed and a second portion of fresh dichlorethane was added. The bath was cooled to 10° C. and 200 ml. dry redistilled triethylamine was added dropwise at such a rate that the inside temperature did not rise above 20° C. When all the triethylamine had been added, 120 ml. water was added slowly with similar precautions against excessive temperature rise.

To the water-dichlorethane-triethylamine emulsion was added one liter of isopropanol. The product was allowed to settle, or was centrifuged, the supernatant was decanted, and the syrup was triturated with 250 ml. isopropanol. The syrup was dissolved in 750 ml. 75% denatured ethyl alcohol and 60 ml. of 5N sodium hydroxide was added to the solution. The precipitated sodium salt was isolated by decantation or centrifugation. The salt was triturated with 250 ml. 75% ethyl alcohol. It was then taken up in water and dialyzed against distilled water until free of inorganic sulfate.

The aqueous solution was brought to neutral pH with a small amount of sodium hydroxide, and was concentrated to roughly a 20% solution. The product was precipitated by addition of 2 volumes of ethanol and saturated sodium chloride equal to 1% of the aqueous volume. The syrup was hardened by trituration with 95% to 100% alcohol, and hard granular mass was dried in high vacuum over a suitable desiccating agent. It was found to have an activity of 30 to 35 international units per mg. (as compared to heparin which is the established standard at 100 units per mg.).

Dialysis is somewhat slow and cumbersome on a larger scale. Therefore, other means of removal of inorganic ions and other impurities may be employed. After the precipitation of the sodium salt in the presence of a considerable excess of sodium hydroxide, the salt can then be taken up in water, and repeatedly precipitated by addition of sufficient ethyl alcohol, until no trace of inorganic sulfate remains. At each step, total precipitation of active material must be achieved in order to avoid a shift in the molecular weight distribution. Alternatively the chitin sulfate may be passed over a suitable cation type ion exchange resin. Some short-chain, relatively inactive polysaccharides are also absorbed, and the amount and character of the material lost on the column is very similar to what is lost through a dialyzing membrane.

*Example II*

Commercial Pectin was dialysed and lyophilized. 1.1 grams of this product was sulfated in 40 mls. dichlorethane with 3 mls. chlorsulfonic acid at 5° C. for 3 or more hours.

A sodium salt isolated according to the procedure of Example I from the described neutralization via triethylamine produced a yield of 731 mgs. assaying (in vitro) 21 units/mg. and having a relative viscosity of 1.8 and 13.26% sulfur.

*Example III*

Oxidized cellulose was prepared by reacting commercially purified cellulose (Solka Flac #40) with nitrogen dioxide in the gaseous state with sodium sulfate, anhydrous, as desiccant for 70 hours at 0° C. The product was determined to have a carboxyl acid content of 1.8 milliequivalents/gm. corresponding to an oxidation of forty percent of the primary alcohol groups. Four gms. of this material, insoluble in water except in the presence of excess alkali, was sulfated in 100 mls. dichlorethane with 20 mls. chlorsulfonic acid for three hours at 0° C. Neutralization with triethylamine (70 ml.) after washing produced a basic sulfate soluble in 75% ethyl alcohol. Basic salts of lower sulfate content were insoluble in this solvent thus effecting a convenient separation of unreacted material. The recovered yield of sodium salt from the aqueous alcohol-soluble amine salt was in excess of 4 grams, had an (in vitro) assay of 19 units/mg., contained 7.7% sulfur, and had a relative viscosity of 1.08.

Others may practice the invention in all of its useful aspects, employing all of the novel features and equivalents thereof which would be suggested to one skilled in the art. All such practice is considered to be included within the spirit of the invention if it falls within the scope of the appended claims.

We claim:
1. A process for simultaneously sulfating and degrading chitin which comprises dissolving a sulfating agent from the group consisting of chlorsulfonic acid and sulfurtrioxide in a halogenated alkane solvent which is inert to said agent, adding dry chitin to said solution at a temperature not exceeding room temperature, reacting the mixture at about room temperature for several hours, removing excess sulfating agent by washing with additional solvent, neutralizing the mixture by adding an anhydrous, nitrogen-containing compound of the formula $R_xNH_{3-x}$ in which $x$ is 0, 1, 2, or 3, and R is an aliphatic radical containing up to 18 carbon atoms, extracting the sulfated product, forming the alkali metal salt thereof and recovering the substantially pure salt.

2. The process for simultaneously sulfating and partially degrading chitin which comprises dissolving chlorsulfonic acid in dichloroethane, adding dry chitin to said solution below room temperature, reacting the mixture for several hours at about room temperature, removing excess chlorsulfonic acid by washing the mixture with additional dicloroethane, neutralizing the mixture by adding anhydrous triethylamine, extracting the sulfated chitin with alcohol, converting the amine salt into the sodium salt and recovering the sodium salt of the substantially fully sulfated chitin.

References Cited in the file of this patent

UNITED STATES PATENTS

| | | |
|---|---|---|
| 2,212,521 | Harris | Aug. 27, 1940 |
| 2,508,433 | Snyder | May 23, 1950 |
| 2,599,172 | Hadidian | June 3, 1952 |
| 2,612,498 | Alburn | Sept. 30, 1952 |
| 2,612,499 | Pulver | Sept. 30, 1952 |
| 2,638,470 | Alburn | May 12, 1953 |
| 2,689,244 | Jones | Sept. 14, 1954 |
| 2,697,093 | Jones | Dec. 14, 1954 |